United States Patent [19]

Michon

[11] Patent Number: 4,944,573

[45] Date of Patent: Jul. 31, 1990

[54] DEVICE FOR DISTRIBUTING LASER BEAMS USED IN AN ISOTOPIC SEPARATION METHOD

[75] Inventor: Maurice Michon, Draveil, France

[73] Assignee: Commissariat a l'Energie Atomique, France

[21] Appl. No.: 314,944

[22] Filed: Feb. 24, 1989

[30] Foreign Application Priority Data

Mar. 2, 1988 [FR] France ................. 88 02634

[51] Int. Cl.⁵ .................... G02B 27/14; B01D 59/34
[52] U.S. Cl. ................... 350/173; 350/397; 204/157.22; 422/186; 422/186.3
[58] Field of Search ........... 204/157.2, 157.21, 157.22; 250/423 P; 350/370, 397; 422/186, 186.3

[56] References Cited

U.S. PATENT DOCUMENTS

| | | | |
|---|---|---|---|
| 4,073,572 | 2/1978 | Avicola | 350/174 |
| 4,174,150 | 11/1979 | Congleton | 350/174 |
| 4,189,646 | 2/1980 | Vanderleeden | 250/423 P |
| 4,762,402 | 8/1988 | Michon et al. | 350/370 |

FOREIGN PATENT DOCUMENTS

| | | |
|---|---|---|
| 2341873 | 9/1977 | France . |
| 2341970 | 9/1977 | France . |
| 2591510 | 6/1987 | France . |
| 2603427 | 3/1988 | France . |

Primary Examiner—Edward A. Miller
Assistant Examiner—Ngoclan T. Mai
Attorney, Agent, or Firm—Hayes, Soloway, Hennessey & Hage

[57] ABSTRACT

A device for distributing laser beams used in an isotopic separation method. The plurality of laser beams $S_n$ used in the process; where n is a whole number at least equal to 2, are divided by means of a plurality of partially reflecting mirrors and superimposed by suitable dichroic mirrors. The superimposed beams, during several passages, are sent into a reaction chamber. When one of these beams has its fluence equal to the saturation fluence, a new part of the beam is superimposed onto the beams. This is accomplished by means of a suitable dichroic mirror. The interference between this new part and the residual beam having traversed the chamber are avoided. A specific application is for the isotopic separation of uranium vapor by laser beams.

1 Claim, 3 Drawing Sheets

DEVICE FOR DISTRIBUTING LASER BEAMS USED IN AN ISOTOPIC SEPARATION METHOD

FIELD OF THE INVENTION

The object of the present invention is to produce a device for distributing lasers beams used in a method for the isotopic separation by lasers. It applies more particularly to selective reactions, such as uranium vapor isotopic separation by lasers.

BACKGROUND OF THE INVENTION

In an isotopic separation device, an isotopics substance contained in a vapor flow is selectively excited by photoionization, for example.

In known device for distributing laser beams used in isotopic separation reactions such as those described in the French application no. 8 504 827 of Mar. 29, 1985, the selective excitation and photoionization beams necessarily have different polarization in the irradiation zone; in the case where these polarizations are linear they are perpendicular, and are either right or left in the case of circular polarizations.

FIG. 1 illustrates a device according to the prior art. Excitation beam Se and photoionisation beam St, of perpendicular polarization, are superimposed and directed towards a reaction chamber 10 by means of a first Glan prism 15. The Se beam can itself contain several beams having several different wave lengths. The Se and St beams have different absorption cross sections : the Se beam is more absorbed than the St beam. After many passages inside the chamber, the Se beam is attenuated and the selective reaction process is no longer effective. The residual beam St is sent towards a second Glan prism 15 and for a second time is superimposed onto an Se beam coming from a laser source (not shown). After traversing the second Glan prism 15, the superimposed beams Se+St are sent to the chamber until the beam St is fully absorbed. According to the selected atomic transitions, the fact that the polarizations of beams are secured by the assembly is unfavorable.

Other devices dividing the beams by means of suitably-adapted partially reflecting mirrors have been studied in order to overcome this drawback — there is an open choice for polarizations.

FIG. 2 shows such an arrangement of the device using partially reflecting mirrors. The selective excitation beam Se capable of containing several beams of different wave lengths is superimposed onto one photoionization beam St. The superimposed beams are divided into two parts P1 and P2 by a first partially reflecting mirror M1. The P1 part is directed towards the reaction chamber 10. The part P2 is directed towards a second partially reflecting mirror by means of synchronization means 16. The part P1 is sent into the chamber 10 for multiple passages. When the fluence of the beam St is equal to the wavelength saturation fluence of this beam, i.e. when the number of pulsed photons per unit area on the photoionization wavelength is equal to the reciprocal value of the absorption cross section for this wavelength, the residual part of P1 is superimposed onto the part P2 coming from the partially reflecting mirror M1. The pulses P1 and P2 are synchronized by synchronization means 16.

A second partially reflecting mirror M2 divides into two the beams P1 and P2 originating from the partially reflecting mirror M1.

The choice of the reflection coefficients of partially reflecting mirrors, the path length inside the chamber between the two mirrors and the number of mirrors makes it possible to use more advantageously the energy of the various laser beams.

In this type of device, efficiency is limited by the formation of interference between the residual part P1 and the part P2 of the beams during their superimposition. This interference destroys the spacial homogeneity of the beams and which is vital for proper working of the extraction process.

SUMMARY OF THE INVENTION

Whilst leaving open the choice for polarizing various beams, the present invention allows all interference between the beams to be eliminated.

The present invention also enables the intensity values of the beams to be adapted to the various values of the absorption cross sections on the various wavelengths involved.

More precisely, the object of the present invention is to produce a device for distributing beams used in an isotopic separation method by lasers comprising :

inside a chamber, a body from which a substance is to be extracted, said body flowing inside the chamber,
   laser sources supplying laser pulses according to the beams S1, . . . ,Sn, n being a whole number at least equal to 2 and corresponding to the number of beams used for extraction with different wavelengths allowing for selective excitation of the substance to be extracted and transformation of said substance after excitation, each wavelength corresponding to a value of the absorption cross section of the substance to be extracted,
   partially reflecting mirrors making it possible to divide the beams S1, . . . , Sn into several parts,
   means for superimposing the beams S1, . . . , Sn and introducing them into various places inside the chamber.
   return means allowing the beams to pass through the chamber many times and allowing for adjustment of the path lengths through the chamber, The means for superimposing the beams comprise dichroic mirrors of various categories, each category presenting different spectral characteristics from those of other categories. The partially reflecting dichroic mirrors are disposed in such a way as to optimize absorption of at least two beams of different lengths, regardless of the absortion cross section values corresponding to the wavelengths of these beams.

The dichroic mirrors are used as filters. A first part of the superimposed beams used in the extraction process is directed towards the reaction chamber for a path including several passages through the chamber.

According to a preferred embodiment of this device, when the fluence of one of these beams is equal to the saturation fluence, a new part of this beam is superimposed onto the beams which have already traversed the chamber. This superimposition is effected by means of a suitable dichroic mirror which makes it possible to reflect the beams which have traversed the chamber and whose fluence is greater than the saturation fluence. According to the invention, the dichroic mirror is selected so that it transmits the beam whose fluence is equal to the saturation fluence and allows for superimposition of a new part of this beam onto the other beams whose fluence is greater than the saturation fluence. The intensity of the new part of the superimposed beam is greater than the saturation fluence.

This means for superimposing the beams makes it possible to eliminate interference between the residue of the beam whose fluence is equal to the saturation fluence and the new part of the beam.

BRIEF DESCRIPTION OF THE DRAWINGS

Other characteristics and advantages of the invention shall be more readily understood on reading the following description given by way of mere illustration and in no way restrictive, and with reference to the annexed FIGS. 3 and 4 in which.

DETAILED DESCRIPTION OF THE PREFERRED EMBODIMENTS

Figure 1:
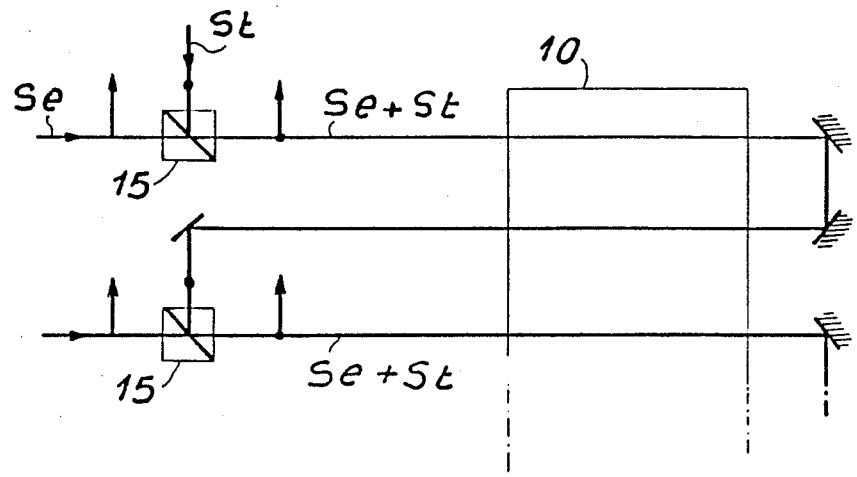
FIG. 1 illustrates a laser beam device according to the prior art for isotopic separation.
Figure 2:
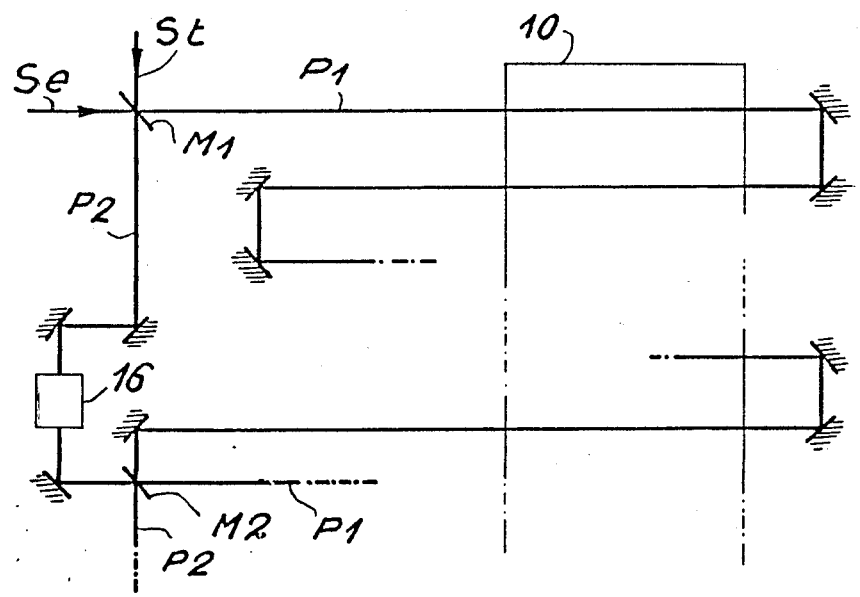
FIG. 2 shows a prior art arrangement of a device that divides beams using partially reflecting mirrors.
Figure 3A:
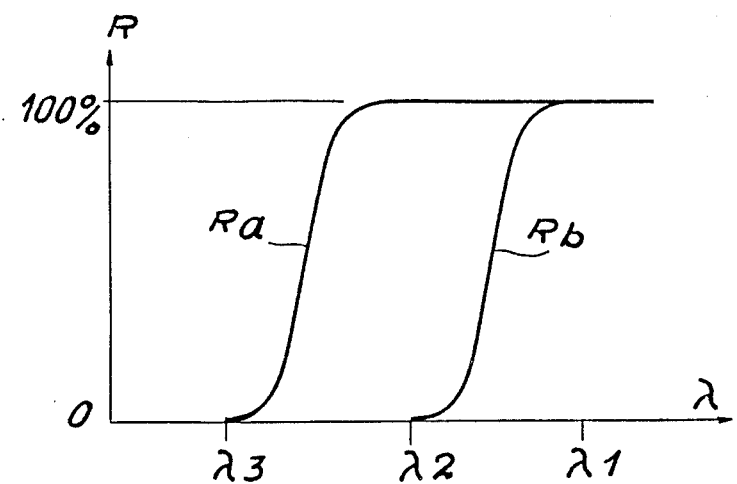
FIG. 3A shows the reflectivity curves of the two dichroic mirrors according to the wavelength.

FIG. 3A shows the reflectivity curves of two dichroic mirrors according to the wavelength.

The two curves Ra and Rb show a very marked flank and thus pass quite openly when the wavelength increases readily change from a nil-reflectivity state to a full-reflectivity state (100%). The dichroic mirrors corresponding to these curves are used for superimposing the beams S1, S2 and S3 whose respective wavelengths are $\lambda 1$, $\lambda 2$ and $\lambda 3$. The wavelength $\lambda 3$ is reflected by neither of these two mirrors. The wavelength $\lambda 2$ is reflected by the mirror corresponding to the curve Ra and is transmitted by the mirror corresponding to the curve Rb. The wavelength $\lambda 1$ is reflected by the two mirrors.

Figure 3B:
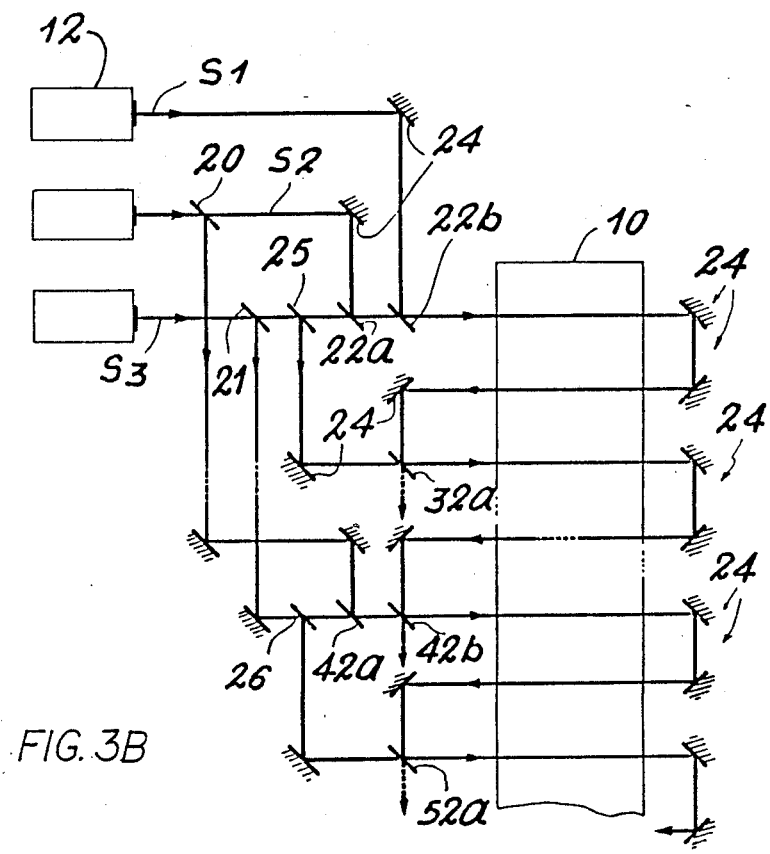
FIG. 3B shows a device according to the invention dividing up three laser beams.

FIG. 3B shows a device according to the invention dividing up three beams $\lambda 1$, $\lambda 2$,$\lambda 3$ and using dichroic mirrors, as illustrated in FIG. 3A.

Laser sources 12 deliver beams S1, S2, S3 with wavelengths $\lambda 1$, $\lambda 2$ and $\lambda 3$ respectively. In this example, it is assumed that the intensity of each beam S1, S2, S3 is the same. The absorption cross sections corresponding to the wavelengths $\lambda 1$, $\lambda 2$, $\lambda 3$ are different : the absortion cross section at $\lambda 3$ is greater than the absorption cross section at $\lambda 2$, which is for example greater than the absorption cross section at $\lambda 1$.

The absorption cross section at $\lambda 3$ is equal to twice the absorption cross section at $\lambda 2$, itself equal to twice the absorption cross section at $\lambda 1$, for example. The reflection coefficient and the transmission coefficient of the partial reflecting mirrors used in this example are then 0.5.

FIG. 3B shows that the beam S1 is sent by a return means 24, for example a mirror, towards a first dichroic mirror 22b, characterized by the reflectivity curve Rb. The beam S2 is divided into two parts by means of a partially reflecting mirror 20. A first part of the beam S2 is directed by a mirror, for example, towards a second dichroic mirror 22a characterized by the reflectivity curve Ra. The beam S2 is reflected by the second dichroic mirror 22a and is transmitted and superimposed onto the beam S1 by the the first dichroic mirror 22b.

The beam S3 is divided a first time by the partially reflecting mirror 21 then for a second time by the partially reflecting mirror 25. The beam S2 is afterwards superimposed onto the beams S1 and S2 after crossing the dichroic mirrors 22a and 22b.

The superimposed beams S1, S2, S3 make many passages through the chamber 10. In order to do this, the beams S1, S2, S3 are sent by sending means 24, mirrors for example. When the fluence of one of the beams, S3 for example, is equal to the saturation fluence for example, the part of S3 derived from its second division is superimposed onto the beams S1 and S2. The residual beam of S3 (marked by dots on FIG. 3B) is separated from the other beams having traversed the chamber by going through a dichroic mirror 32a of the same type as the dichroic mirror 22a. Thus, all interference forming between the residual beam S3 and the part of S3 derived from the second division are eliminated.

After a new path constituted by several passages inside the chamber 10, the fluence of the beams S2 and S3 is equal to the saturation fluence for the wavelengths $\lambda 2$ and 3, for example. The beams constituted by a second part of beam S2 and the beam derived from the first division of the beam S3 are superimposed onto the beams having traversed the chamber 10 by a set of partially reflecting mirrors 26 and the dichroic mirrors 42a, 42b of the same type as the mirrors 22a and 22b respectively.

Having traversed the chamber 10, the beams S2 and S3, whose fluence is equal to the saturation fluence, are separated from the beam S1 by passage through the dichroic mirror 42b (these beams are illustrated by the dot-and-dashes on FIG. 3B). The lengths of the distance covered by the various beams are equalized so as to obtain synchronization between the various pulses at the time of their superimposition.

Similarly as previously mentioned, the superperimposed beams S1, S2, S3 traverse the chamber many times. When the fluence of the beam S3, for example, is equal to the saturation fluence, for example, the part of the beam S3 derived from the first division is superimposed onto the beams S1 and S2. The residual beam of S3 (shown by dots on FIG. 3B) is separated from the other beams having traversed the chamber 10 by passage through the dichroic mirror 52a of the same type as that of the dichroic mirror 22a .

On FIG. 3B, the absorption cross section of the beam S3 is assumed to be equal to twice the absorption cross section of the beam S2, the latter being equal to twice the absorption cross section of the beam S1. It is also assumed that the beams have identical intensities. This example is by no means restrictive, but is merely a question of adapting the reflection coefficients of the partially reflecting mirrors and their number so as to adapt the device to another set of values of the absorption cross sections and laser intensities.

Similarly, another set of wavelengths results in using dichroic mirrors possessing spectral characteristics other than those described by the curves Ra and Rb.

Figure 4A:
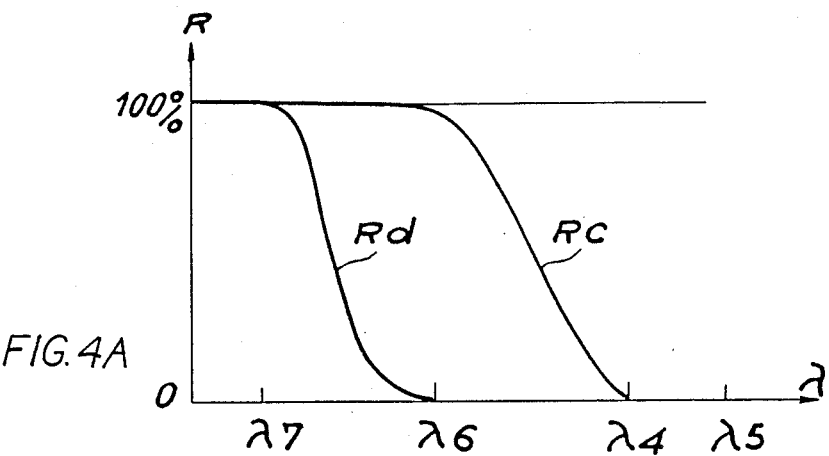
FIG. 4A shows the reflectivity curves of the two dichroic mirrors according to the wavelength.

FIG. 4A shows the reflectivity curves of the two dichroic mirrors according to the wavelength.

The dichroic mirrors corresponding to these curves are used to superimpose beams S4, S5, S6, S7 of respective wavelengths $\lambda 4$, $\lambda 5$, $\lambda 6$, $\lambda 7$.

A first mirror, whose characteristic curve is marked Rd, allows for reflection of the beam on the single wavelength λ7.

A second mirror, whose characteristic curve is marked Rc, allows for reflection of the beams on wavelengths λ6 and λ7.

Figure 4B:
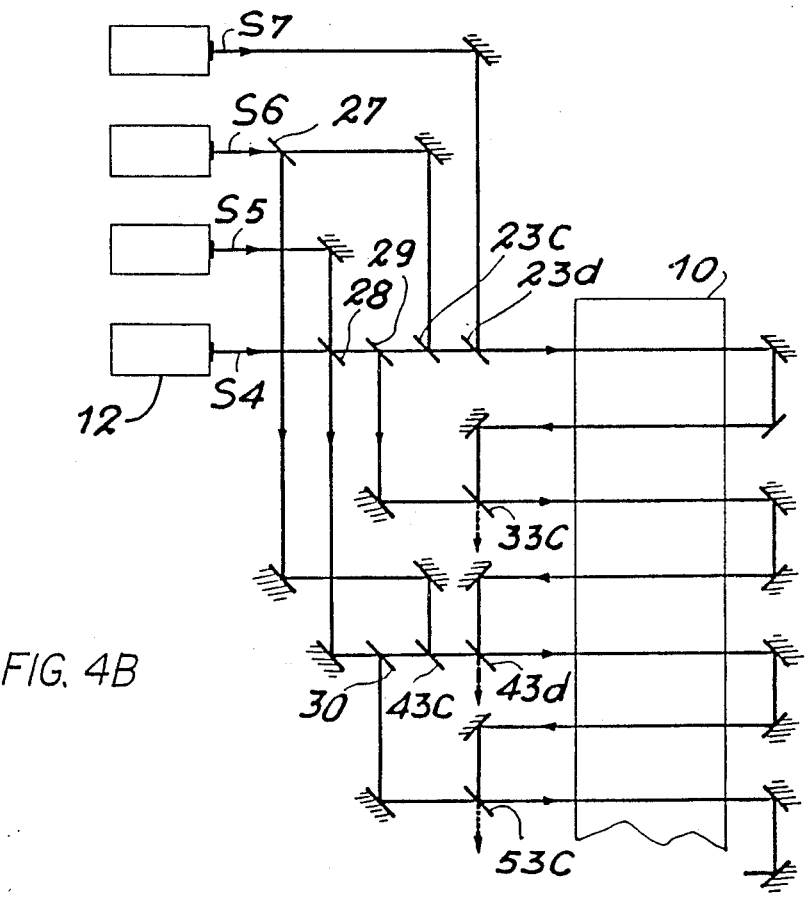
FIG. 4B shows a device according to the invention dividing up four laser beams.

According to the invention, FIG. 4B shows a device dividing up 4 beams S4, S5, S5, S7 of respective wavelengths λ4, λ5, λ6, λ7 and using dichroic mirrors such those described by the curves Rc and Rd.

The laser beams S4, S5, S6 and S7 are delivered by laser sources 12. The laser beams are superimposed by a set of dichroic mirrors 23c, 23d with respective characteristic curves Rc and Rd.

The superimposed beams traverse the chamber 10, and are sent by sending means 24, mirrors for example, thus making it possible to adjust the path length of the beams during their passages inside the chamber.

When the fluence of at least one beam, S4 for example, is equal to the saturation fluence for example, a new part of the beam S4 is superimposed onto the beams having traversed the chamber. This new part of the beam S4 is derived from one division of the beam S4 upon leaving the laser 12 by the partially reflecting mirrors 28 and 29.

The superimposition of the new part of the beam S4 onto the beams having traversed the chamber 10 is effected by means of the dichroic mirror 33c of the same type as the dichroic mirror 23c. The passage through this dichroic mirror 33c makes it possible to separate the residual beam S4 having already traversed the chamber 10 from the other beams and thus avoid the formation of interference between this residual beam S4 and the new part of the beam S4 (the separated residual part is shown by dots in FIG. 4B).

During the course of the distance covered in a similar way to the case described in FIG. 3B, when one beam has its fluence equal to the saturation fluence for example, it is replaced by a new part of this beam derived from a division upon leaving the lasers by a partially reflecting mirror 27, 28. The beams are superimposed by dichroic mirrors 43c, 43d, 53c, the letter c indicating a mirror of the 23c type and the letter d indicating a mirror of the 23d type. The partially reflecting mirror 30 participates in the superimposition of the beams by the dichroic mirrors 43c and 43d by dividing up the beam derived from the mirror 28.

What is claimed is:

1. Device for distributing laser beams used in an isotopic separation method by lasers, comprising:
   (a) a flow chamber for containing a body from which a substance is to be extracted;
   (b) a plurality of laser sources delivering laser pulses of beams S1, . . . , Sn, n being a whole number at least equal to 2, with different wavelengths allowing for a selective excitation of the substance to be extracted and a transformation of said substance after excitation, each wavelength corresponding to a valve of the absorption cross section of the substance to be extracted;
   (c) a plurality of partially reflecting mirrors allowing for beams S1, . . . , Sn to be divided into several parts;
   (d) means for superimposing beams S1, . . . Sn and introducing them into various places of the chamber; and
   (e) a means for returning beams following several passages through the chamber and an adjustment of the path lengths through the chamber, wherein the means for superimposing beams comprise various categories of dichroic mirrors, each category presenting spectral characteristics different from those of the other categories, the partially reflecting mirrors and the dichroic mirrors being selected and disposed so as to optimize the absorption of at least two beams of different wavelengths, regardless of the values of the absorption cross sections corresponding to the wavelengths of these beams.

* * * * *